(12) United States Patent
Kelley et al.

(10) Patent No.: US 8,616,254 B2
(45) Date of Patent: Dec. 31, 2013

(54) WHEEL HUB WITH AIR PASSAGE FOR TIRE INFLATION SYSTEM

(75) Inventors: David C. Kelley, Birmingham, MI (US); Scott A. Jenkinson, Davisburg, MI (US)

(73) Assignee: Arvinmeritor Technology, LLC, Troy, MI (US)

( * ) Notice: Subject to any disclaimer, the term of this patent is extended or adjusted under 35 U.S.C. 154(b) by 0 days.

(21) Appl. No.: 13/241,369

(22) Filed: Sep. 23, 2011

(65) Prior Publication Data
US 2013/0076110 A1 Mar. 28, 2013

(51) Int. Cl.
*B60C 23/10* (2006.01)

(52) U.S. Cl.
USPC ......... 152/415; 152/416; 152/417; 301/105.1

(58) Field of Classification Search
USPC ................ 301/105.1; 152/415, 416, 417, 418
See application file for complete search history.

(56) References Cited

U.S. PATENT DOCUMENTS

| | | | |
|---|---|---|---|
| 3,705,614 A | 12/1972 | Juttner et al. | |
| 4,498,709 A | 2/1985 | Wells et al. | |
| 5,174,839 A * | 12/1992 | Schultz et al. | 152/415 |
| 5,979,526 A * | 11/1999 | Chamoy | 152/417 |
| 6,260,595 B1 | 7/2001 | Cobb | |
| 6,394,159 B1 | 5/2002 | Cobb | |
| 6,871,683 B2 | 3/2005 | Cobb | |
| 6,994,136 B2 | 2/2006 | Stanczak | |
| 7,185,688 B2 | 3/2007 | Hayes et al. | |
| 7,690,412 B1 * | 4/2010 | Jenkinson et al. | 152/416 |
| 7,931,061 B2 | 4/2011 | Gonska et al. | |
| 7,967,045 B2 | 6/2011 | Jenkinson et al. | |
| 2006/0018766 A1 | 1/2006 | Stanczak | |
| 2010/0154955 A1 | 6/2010 | Jenkinson et al. | |
| 2011/0162773 A1 | 7/2011 | Gonska et al. | |

FOREIGN PATENT DOCUMENTS

| | | |
|---|---|---|
| EP | 0521719 | 1/1993 |
| EP | 0588595 | 3/1994 |

OTHER PUBLICATIONS

European Search Report, mailed Feb. 5, 2013, EP Application No. 12181079.0.

* cited by examiner

*Primary Examiner* — S. Joseph Morano
*Assistant Examiner* — Jean Charleston
(74) *Attorney, Agent, or Firm* — Brooks Kushman P.C.

(57) ABSTRACT

A wheel hub extends from an outboard end to an inboard end and has an outer peripheral surface and an inner peripheral surface spaced radially inward of the outer peripheral surface. A first air passage extends from the outboard end toward the inboard end. A second air passage extends from the inner peripheral surface to intersect the first air passage. The second air passage comprises a removed portion that extends circumferentially beyond a cross-section of the first air passage at the intersection.

24 Claims, 2 Drawing Sheets

WHEEL HUB WITH AIR PASSAGE FOR TIRE INFLATION SYSTEM

TECHNICAL FIELD

This invention generally relates to a wheel hub having an air passage for a tire inflation system.

BACKGROUND OF THE INVENTION

Tire inflation systems are configured to maintain a desired level of air pressure within vehicle tires during operation of the vehicle. The system must transfer air from a non-rotating component through a rotating wheel component such as the wheel hub, for example. Most air passages internal to wheel hubs are created using intersecting "rifle-drilled" holes. A typical rifle-drilled hole arrangement includes at least two holes that intersect each other. In one configuration, a first rifle-drilled hole is made to extend in a generally axial direction along a length of the wheel hub. A second rifle-drilled hole is drilled from an outer peripheral surface of the wheel hub in an inward direction to intersect the first rifle-drilled hole.

Due to the nature of drilling long holes, it is sometimes difficult to ensure that the drilled holes properly intersect. If the holes fail to intersect properly, the result is an improperly formed air passage. Further, as the second rifle-drilled hole extends through the outer peripheral surface, it can be difficult to provide an air-tight passage.

SUMMARY OF THE INVENTION

A wheel hub extends from an outboard end to an inboard end and has an outer peripheral surface and an inner peripheral surface spaced radially inward of the outer peripheral surface. A first air passage extends from the outboard end toward the inboard end. A second air passage extends from the inner peripheral surface to intersect the first air passage. The second air passage comprises a removed portion that extends circumferentially beyond a cross-section of the first air passage at the intersection.

In one example, the wheel hub is used in a wheel end assembly that includes a spindle. The wheel hub is supported for rotation relative to the spindle by at least one bearing. A seal assembly is positioned between the spindle and wheel hub to provide a sealed chamber. Air enters the sealed chamber from an air supply and is then communicated into the second air passage, and then to the first air passage. Air exiting the first air passage is communicated to a rotating tire.

A method of manufacturing the wheel end includes (a) forming a first air passage to extend from an outboard end of a hub body toward an inboard end; and (b) forming a second air passage to extend from an inner peripheral surface of the hub body to intersect the first air passage at an intersection such that the second air passage comprises a removed portion that extends circumferentially beyond a cross-section of the first air passage at the intersection.

These and other features of the present invention can be best understood from the following specification and drawings, the following of which is a brief description.

DETAILED DESCRIPTION

Figure 1:
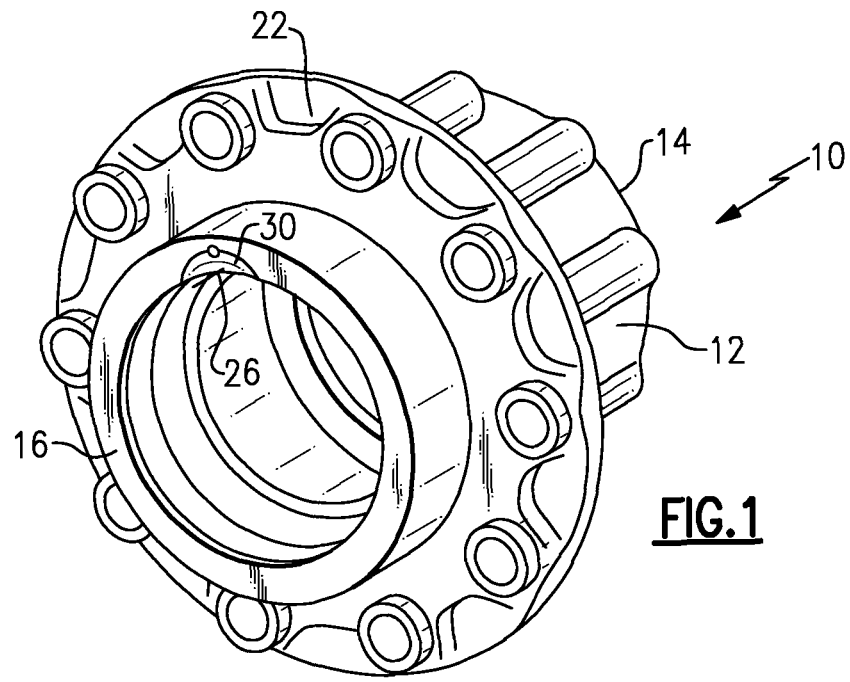
FIG. 1 is a perspective view of an inboard end of a wheel hub incorporating the subject invention.

As shown in FIGS. 1-4, a wheel hub 10 extends from an inboard end to an outboard end. The term "inboard" refers to a direction that faces generally toward a vehicle center and the term "outboard" refers to a direction that faces generally away from a vehicle center. The wheel hub 10 comprises a hub body 12 extending from an outboard end face 14 to an inboard end face 16. The wheel hub 10 is rotatable about an axis A. The hub body 12 includes an outer peripheral surface 18 and an inner peripheral surface 20 that is spaced radially inward from the outer peripheral surface 18 toward the axis A.

As best shown in FIG. 1, the wheel hub includes a flange 22 with a plurality of holes to receive fasteners. The flange 22 provides a mounting interface for a rotating brake component, such as a brake drum or brake rotor, for example.

Figure 2:
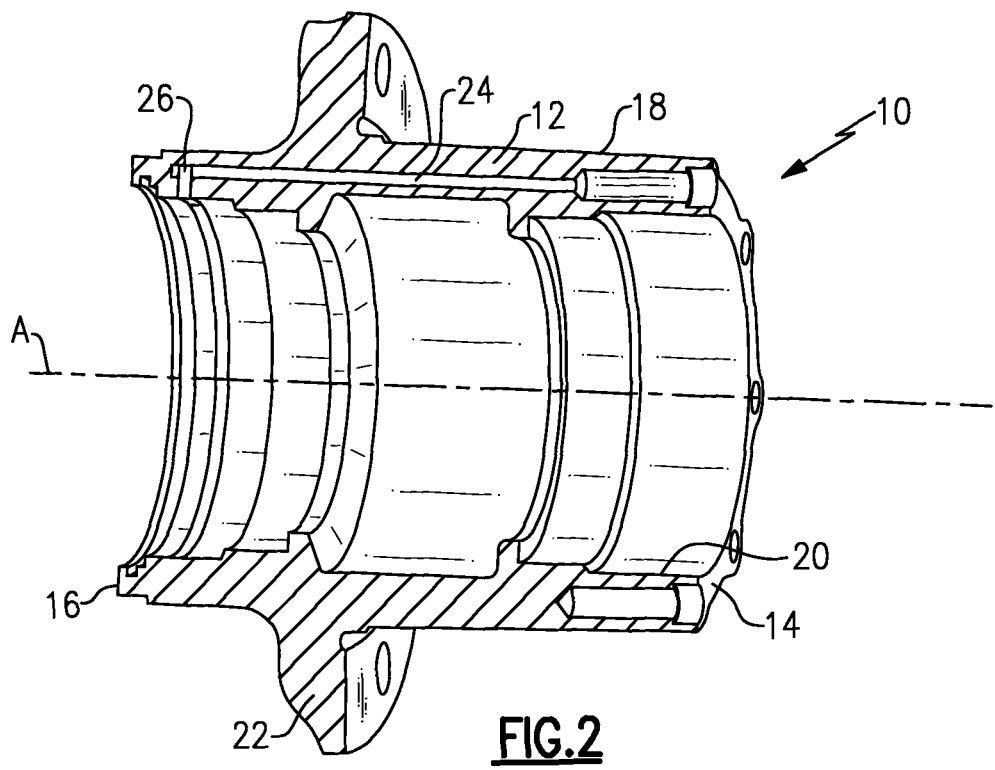
FIG. 2 is a section view of the wheel hub of FIG. 1
Figure 3:
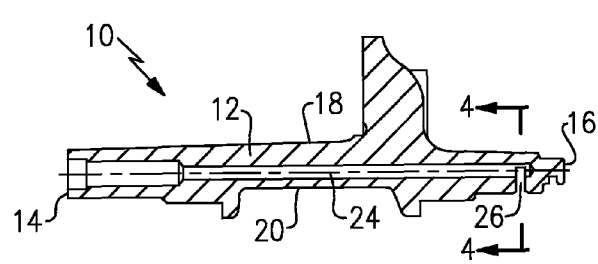
FIG. 3 is a partial cross-sectional view of the wheel hub of FIG. 1 showing an axial air passage and a radial air passage.

In one example, the hub body 12 includes a first air passage 24 that extends generally in an axial direction from the outboard end face 14 toward the inboard end face 16. The first air passage 24 is a long passage that extends almost the entire length of the wheel hub 10. In one example, the first air passage 24 is formed with a rifle drilling process that stops just short of the inboard end face 16 of the hub body 12 as best seen in FIGS. 2 and 3.

The hub body 12 also includes a second air passage 26 that extends from the inner peripheral surface 20 toward the outer peripheral surface 18 in a generally radial direction away from the axis A. The second air passage 26 is formed to intersect the first air passage 24 at an intersection near the inboard end face 16. Thus, in the example shown, the hub body 12 includes an axial air passage, i.e. the first air passage 24, and a radial air passage, i.e. the second air passage 26.

The second air passage 26 is formed such that the passage intersects the first air passage 24 at an intersection point but does not extend radially beyond the first air passage 24 to exit the outer peripheral surface 18, i.e. the first air passage 24 terminates within the hub body itself and is not open to the outer peripheral surface 18. The second air passage 26 comprises a removed portion 30 of the hub body 12 that is larger in cross-section than a cross-section of the first air passage 24 at the intersection point.

Figure 4:
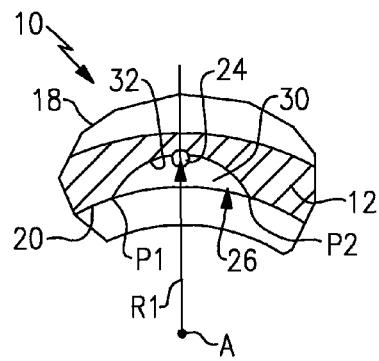
FIG. 4 is a section view taken along lines 4-4 of FIG. 3.

As shown in FIG. 4, the removed portion 30 is defined by a surface 32 that extends from a first location or point P1 at the inner peripheral surface 20 on one side of the first air passage 24 to a second location or point P2 at the inner peripheral surface 20 on an opposite side of the first air passage 24. As such, the removed portion 30 extends circumferentially beyond a cross-section of the first air passage 24 at the intersection. P1 and P2 are circumferentially spaced apart from each other about the axis A. Thus, the removed portion 30 extends circumferentially beyond each side of the first air passage 24 at the intersection point.

In one example, the surface 32 that defines the removed portion 30 comprises an arcuate or curved surface. The surface 32 is defined by a radius that extends from the axis A to the intersection area at the first air passage 24, as indicated by R1 in FIG. 4. While the surface 32 is shown as having a curved configuration, the surface 32 could also be formed to have other profiles; however, the removed portion 30 should be formed to extend outward from the inner peripheral surface 20 to intersect, but not extend radially outward to the outer peripheral surface 18. Further, the removed portion 30 should comprise a section of the hub body 12 that is removed from one side of the first air passage 24 to an opposite side of the first air passage 24, such as a removed circumferential area or removed radiussed section for example.

In one example, the second air passage 26 comprises a plunge cut that is made with a circular mill tool or cutting wheel. In one example configuration, the second air passage 26 is formed with a one pass radial plunge cut. In another example, a face cutting tool having a pencil-shaped cutter moving over an arc can be used to remove the desired amount of material to form the second air passage 26. It should be understood that the circular mill tool and face cutting tool are just examples of machining methods, and that other machining methods could also be used to form the second air passage 26.

By forming the second air passage in this manner, it eliminates the need for an additional plug/sealant at an outer periphery of the hub body to achieve an air-tight passage.

Figure 5:
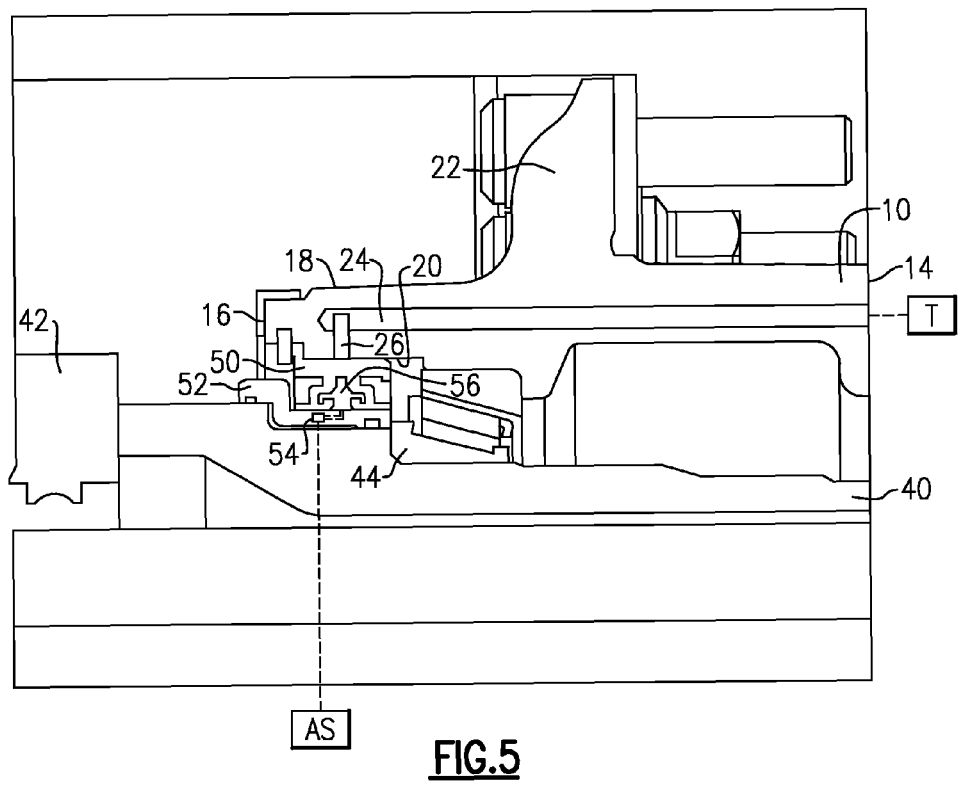
FIG. 5 is a magnified, partial cross-section of a wheel hub assembly incorporating a seal assembly for a tire inflation system.

As shown in FIG. 5, the wheel hub 10 is used as part of a tire inflation system to deliver air from an air supply AS to a tire T mounted for rotation with the wheel hub 10. The tire inflation system supplies air to the tires when the tires become under-inflated.

A non-rotating spindle 40 is connected to an axle structure schematically indicated at 42. The wheel hub 10 is supported for rotation relative to the spindle 40 by at least one bearing 44. A seal assembly 50 is positioned between the spindle 40 and the wheel hub 10. Examples of the seal assembly 50 are disclosed in U.S. Pat. No. 7,931,061, which is assigned to the same assignee as the subject application, and which is herein incorporated by reference.

A sleeve 52 is fixed to the spindle 40 and includes an inlet 54 that is in fluid communication with the air supply AS. The sleeve 52 delivers air to a sealed chamber 56 formed within the seal assembly 50 between the spindle 40 and the wheel hub 10. The chamber 56 delivers air into the second air passage 26 and then into the first air passage 24. Air exits the first air passage 24 and is delivered to the tire T in a known manner.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A wheel hub comprising:
a hub body rotatable about an axis and extending from an inboard end to an outboard end, said hub body having an outer peripheral surface and an inner peripheral surface spaced radially inward of said outer peripheral surface;
a first air passage extending generally from said outboard end toward said inboard end; and
a second air passage extending from said inner peripheral surface to intersect said first air passage at an intersection located axially between an inboard bearing and said inboard end of said hub body, said second air passage comprising a removed portion that extends in a circumferential direction about said axis at said intersection.

2. The wheel hub according to claim 1 wherein said removed portion has a curved surface defined by a radius extending from said axis to said intersection at said first air passage.

3. The wheel hub according to claim 1 wherein said second air passage does not extend radially outward to said outer peripheral surface.

4. The wheel hub according to claim 1 wherein said second air passage is located adjacent said inboard end of said wheel hub.

5. The wheel hub according to claim 1 wherein said first air passage extends generally in an axial direction and said second air passage extends generally in a radial direction with said second air passage being defined by a cross-sectional area that is greater than an area defined by said cross-section of said first air passage at said intersection.

6. A wheel end assembly comprising:
a non-rotating spindle;
at least one bearing mounted on the non-rotating spindle;
a wheel hub rotatable supported on said at least one bearing for rotation relative to said non-rotating spindle about an axis, said wheel hub comprising a hub body extending from an inboard end to an outboard end and having an outer peripheral surface and an inner peripheral surface spaced radially inward of said outer peripheral surface;
a first air passage extending generally from said outboard end toward said inboard end; and
a second air passage extending from said inner peripheral surface to intersect said first air passage at an intersection located axially between said at least one bearing and said inboard end of said hub body such that said second air passage does not extend to said outer peripheral surface, and wherein said second air passage provides an air inlet configured to receive air from an air supply and aid first air passage provides an air outlet configured to transfer air to a rotating tire.

7. The wheel end assembly according to claim 6 wherein said second air passage comprises a removed portion that extends in a circumferential direction about said axis at the intersection with said first air passage, said removed portion being defined by a surface that extends from a first location at said inner peripheral surface on one side of said first air passage to a second location at said inner peripheral surface on an opposite side of said first air passage.

8. The wheel end assembly according to claim 6 wherein said first air passage extends generally in an axial direction and said second air passage extends generally in a radial direction with said second air passage being defined by a cross-sectional area that is greater than a cross-sectional area of said first air passage at the intersection between said first and second air passages.

9. The wheel end assembly according to claim 6 including a seal assembly to provide a sealed chamber between said non-rotating spindle and said wheel hub, and wherein air exiting said sealed chamber enters said second air passage.

10. A method of manufacturing a wheel hub comprising:
(a) forming a first air passage to extend from an outboard end of a hub body toward an inboard end; and
(b) forming a second air passage to extend from an inner peripheral surface of the hub body toward an outer peripheral surface to intersect the first air passage at an intersection located axially between an inboard bearing and said inboard end of said hub body and such that the second air passage comprises a removed portion that extends in a circumferential direction about said axis at the intersection.

11. The method according to claim 10 wherein step (b) includes performing a plunge cut with a cutting tool to remove a radiussed portion of the hub body to form the second air passage.

12. The method according to claim 10 wherein step (b) includes forming the second air passage to have a surface extending from a first location at the inner peripheral surface on one side of the first air passage to a second location at the inner peripheral surface on an opposite side of the first air passage.

13. The method according to claim 10 wherein step (b) includes forming the second air passage such that the second air passage does not extend radially outward to the outer peripheral surface.

14. The method according to claim 10 wherein step (b) includes forming the second air passage adjacent the inboard end of the hub body.

15. A method of manufacturing a wheel hub rotatable about an axis comprising:
- (a) forming a first air passage to extend from an outboard end of a hub body toward an inboard end by rifle drilling the first air passage in a generally axial direction; and
- (b) forming a second air passage to extend from an inner peripheral surface of the hub body toward an outer peripheral surface to intersect the first air passage at an intersection such that the second air passage comprises a removed portion that extends in a circumferential at the intersection, and step (b) includes cutting the second air passage such that the second air passage extends in a generally radial direction from the inner peripheral surface to intersect the first air passage.

16. The method according to claim 10 wherein step (b) includes defining the second air passage to have a cross-sectional area that is greater than a cross-sectional area of the first air passage at the intersection.

17. The method according to claim 10 wherein step (b) includes forming the second air passage such that the second air passage does not extend radially outward of the first air passage.

18. The method according to claim 10 wherein step (a) includes forming the first air passage to extend substantially an entire length of the hub body, the first air passage extending from the outboard end and terminating prior to an inboard end face of the hub body.

19. The method according to claim 10 wherein step (a) includes rifle drilling the first air passage in a generally axial direction and step (b) includes performing a plunge cut with a cutting tool to remove a radiussed portion of the hub body to form the second air passage.

20. The wheel hub according to claim 1 wherein the second air passage does not extend radially outward of the first air passage at the intersection.

21. The wheel hub according to claim 1 wherein the first air passage extends substantially an entire length of the hub body, the first air passage extending from the outboard end and terminating prior to an inboard end face of the hub body.

22. The wheel end assembly according to claim 6 wherein said second air passage does not extend radially outward of said first air passage at the intersection.

23. The wheel end assembly according to claim 6 wherein said first air passage extends substantially an entire length of the hub body, said first air passage extending from said outboard end and terminating prior to an inboard end face of said hub body.

24. The wheel end assembly according to claim 6 wherein said non-rotating spindle includes an outboard spindle end and an inboard spindle end that is configured for attachment to an axle structure, and wherein said at least one bearing is mounted between said inboard end of said hub body and said inboard spindle end of said spindle.

* * * * *